US012105440B2

(12) United States Patent
Ieiri et al.

(10) Patent No.: US 12,105,440 B2
(45) Date of Patent: Oct. 1, 2024

(54) IMAGE FORMING APPARATUS, IMAGE FORMING METHOD, AND NON-TRANSITORY RECORDING MEDIUM

(71) Applicants: Yuji Ieiri, Kanagawa (JP); Yuuji Matsuda, Tokyo (JP); Sumihiro Inokuchi, Kanagawa (JP); Hiroshi Okamura, Kanagawa (JP); Tomohide Kondoh, Kanagawa (JP)

(72) Inventors: Yuji Ieiri, Kanagawa (JP); Yuuji Matsuda, Tokyo (JP); Sumihiro Inokuchi, Kanagawa (JP); Hiroshi Okamura, Kanagawa (JP); Tomohide Kondoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/192,160

(22) Filed: Mar. 29, 2023

(65) Prior Publication Data

US 2024/0004327 A1 Jan. 4, 2024

(30) Foreign Application Priority Data

Jul. 1, 2022 (JP) ................................ 2022-107256

(51) Int. Cl.
*G03G 15/08* (2006.01)
*G03G 15/00* (2006.01)

(52) U.S. Cl.
CPC ..... *G03G 15/0863* (2013.01); *G03G 15/0862* (2013.01); *G03G 15/0865* (2013.01); *G03G 15/0889* (2013.01); *G03G 15/5016* (2013.01)

(58) Field of Classification Search
CPC .......... G03G 15/0862; G03G 15/0863; G03G 15/0865; G03G 15/0889; G03G 15/5016
USPC .......................................................... 399/12
See application file for complete search history.

(56) References Cited

U.S. PATENT DOCUMENTS

| | | | |
|---|---|---|---|
| 2005/0053388 | A1 | 3/2005 | Yokoyama et al. |
| 2005/0057209 | A1 | 3/2005 | Andoh et al. |
| 2005/0085945 | A1 | 4/2005 | Andoh et al. |
| 2005/0238372 | A1 | 10/2005 | Shinohara et al. |
| 2006/0110189 | A1 | 5/2006 | Matsuda et al. |
| 2006/0133873 | A1 | 6/2006 | Andoh et al. |
| 2006/0153604 | A1 | 7/2006 | Matsuda et al. |
| 2006/0165442 | A1 | 7/2006 | Kobayashi et al. |

(Continued)

FOREIGN PATENT DOCUMENTS

| | | |
|---|---|---|
| JP | 2021-196415 | 12/2021 |

*Primary Examiner* — Hoang X Ngo
(74) *Attorney, Agent, or Firm* — IPUSA, PLLC

(57) ABSTRACT

An image forming apparatus includes a body, a toner container that is removably set in the body and contains toner, a toner supplier to supply the toner from the toner container to the body, a memory that stores container information that is information of the toner container, and circuitry. The circuitry is to determine, after the toner container is set in the body, based on the container information acquired from the memory, whether the toner container set in the body is same as a toner container set in the body in a past and the container information satisfies a predetermined condition, and to drive the toner supplier in a case where the toner container set in the body is determined to be same as the toner container set in the body in the past and the container information satisfies the predetermined condition.

6 Claims, 7 Drawing Sheets

(56) References Cited

U.S. PATENT DOCUMENTS

| | | | |
|---|---|---|---|
| 2006/0182471 | A1 | 8/2006 | Okamura et al. |
| 2006/0285887 | A1 | 12/2006 | Matsuda |
| 2007/0092278 | A1 | 4/2007 | Matsuda et al. |
| 2007/0122172 | A1 | 5/2007 | Ebara et al. |
| 2007/0140736 | A1 | 6/2007 | Ehara et al. |
| 2007/0172257 | A1 | 7/2007 | Matsuda et al. |
| 2007/0189815 | A1 | 8/2007 | Andoh et al. |
| 2007/0196132 | A1 | 8/2007 | Kobayashi et al. |
| 2007/0212109 | A1 | 9/2007 | Ebara et al. |
| 2007/0217830 | A1 | 9/2007 | Matsuda et al. |
| 2007/0231022 | A1 | 10/2007 | Yokoyama et al. |
| 2007/0253736 | A1 | 11/2007 | Ehara et al. |
| 2007/0258729 | A1 | 11/2007 | Ehara et al. |
| 2008/0292351 | A1 | 11/2008 | Matsuda et al. |
| 2009/0169225 | A1 | 7/2009 | Murata et al. |
| 2009/0190972 | A1 | 7/2009 | Ohkubo et al. |
| 2009/0238613 | A1 | 9/2009 | Ueda et al. |
| 2009/0263158 | A1 | 10/2009 | Murata et al. |
| 2011/0150531 | A1 | 6/2011 | Kobayashi et al. |
| 2011/0176818 | A1 | 7/2011 | Yamamoto et al. |
| 2014/0015192 | A1 | 1/2014 | Wakabayashi et al. |
| 2015/0104200 | A1* | 4/2015 | Matsumoto ........ G03G 15/0863 399/80 |
| 2015/0108714 | A1 | 4/2015 | Wakabayashi et al. |
| 2017/0255152 | A1 | 9/2017 | Okamura et al. |
| 2018/0239285 | A1 | 8/2018 | Fujita et al. |
| 2018/0321074 | A1 | 11/2018 | Kushida et al. |
| 2018/0348664 | A1 | 12/2018 | Okamura et al. |
| 2019/0196360 | A1 | 6/2019 | Inokuchi et al. |
| 2019/0212289 | A1 | 7/2019 | Kushida et al. |
| 2020/0103792 | A1 | 4/2020 | Okamura |
| 2020/0201229 | A1 | 6/2020 | Ieiri |
| 2020/0233361 | A1 | 7/2020 | Hara et al. |
| 2020/0301357 | A1 | 9/2020 | Hommi et al. |
| 2020/0333725 | A1 | 10/2020 | Tomura et al. |
| 2022/0373926 | A1 | 11/2022 | Inokuchi |

* cited by examiner

IMAGE FORMING APPARATUS, IMAGE FORMING METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2022-107256, filed on Jul. 1, 2022, in the Japan Patent Office, the entire disclosure of which is hereby incorporated by reference herein.

BACKGROUND

Technical Field

The present disclosure relates to an image forming apparatus, an image forming method, and a non-transitory recording medium.

Related Art

In an image forming apparatus employing an electrophotographic method, a toner container for containing toner is used. The toner container is removably set in the image forming apparatus, and for example, when the toner in the toner container runs out, the toner container is replaced with another toner container.

For example, there is disclosed a configuration in which, when a toner container to be set is determined to be the same toner container previously set in the image forming apparatus at the time of replacement of the toner container, processing to supply toner from the toner container does not start and message information for prompting the user of the image forming apparatus to replace with another toner container is displayed.

SUMMARY

In one aspect, an image forming apparatus includes a body, a toner container that is removably set in the body and contains toner, a toner supplier to supply the toner from the toner container to the body, a memory that stores container information that is information of the toner container, and circuitry. The circuitry is to determine, after the toner container is set in the body, based on the container information acquired from the memory, whether the toner container set in the body is same as a toner container set in the body in a past and the container information satisfies a predetermined condition, and to drive the toner supplier in a case where the toner container set in the body is determined to be same as the toner container set in the body in the past and the container information satisfies the predetermined condition.

In another aspect, an image forming method performed by an image forming apparatus includes storing, in a memory, container information that is information of a toner container removably set in a body of the image forming apparatus, determining, after the toner container is set in the body, based on the container information acquired from the memory, whether the toner container set in the body is same as a toner container set in the body in a past and the container information satisfies a predetermined condition, and driving a toner supplier to supply toner to the body of the image forming apparatus in a case where the toner container set in the body is determined to be same as the toner container set in the body in the past and the container information satisfies the predetermined condition.

In another aspect, a non-transitory recording medium carries computer readable codes for controlling a computer system to perform a method. The method includes storing, in a memory, container information that is information of a toner container removably set in a body of an image forming apparatus, determining, after the toner container is set in the body, based on the container information acquired from the memory, whether the toner container set in the body is same as a toner container set in the body in a past and the container information satisfies a predetermined condition, and driving a toner supplier to supply toner to the body of the image forming apparatus in a case where the toner container set in the body is determined to be same as the toner container set in the body in the past and the container information satisfies the predetermined condition.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
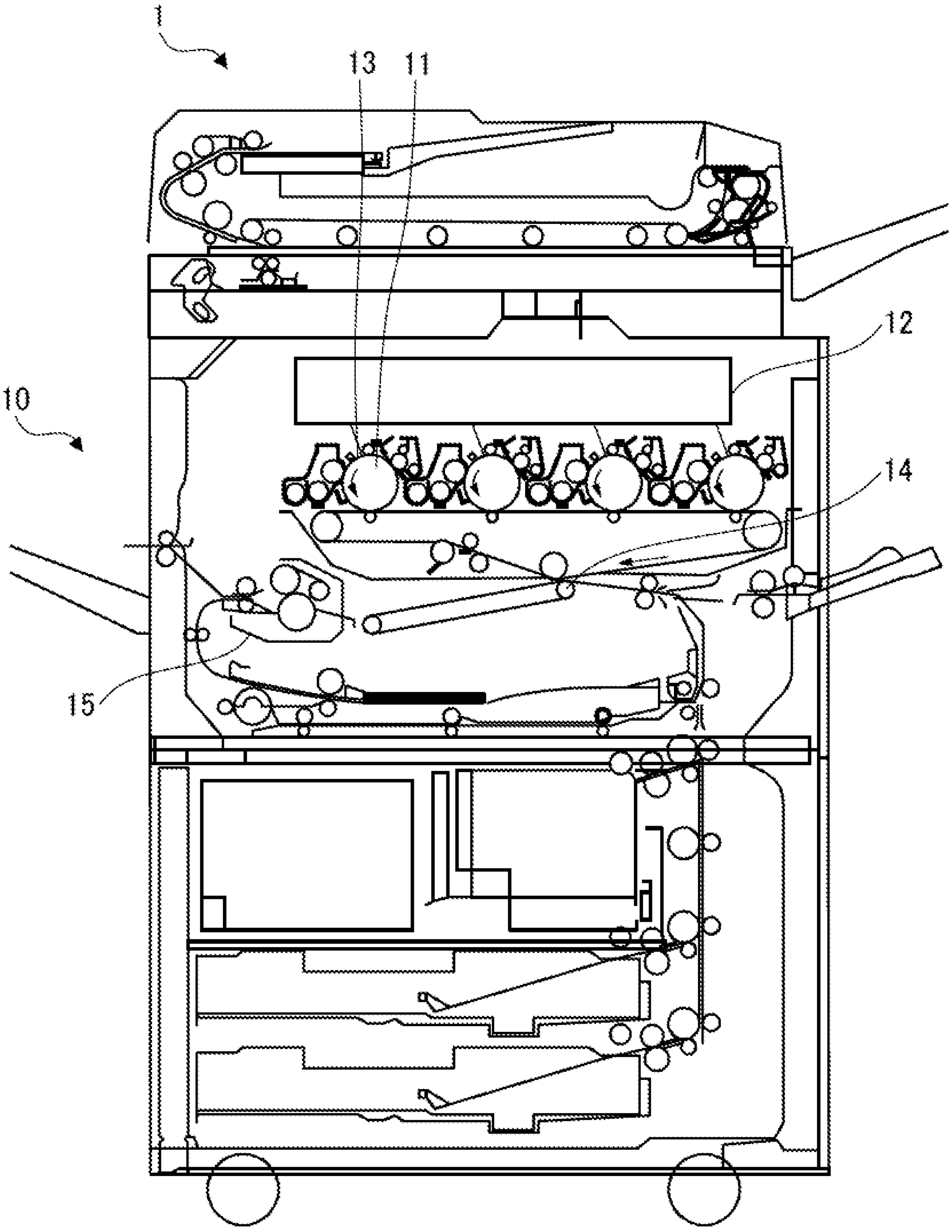
FIG. 1 is a diagram illustrating an example of a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity.

However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, an embodiment of the present disclosure is described with reference to the drawings. In the drawings, the same reference numerals are given to the same components, and redundant explanation may be omitted.

Overall Configuration of Image Forming Apparatus

Figure 2:
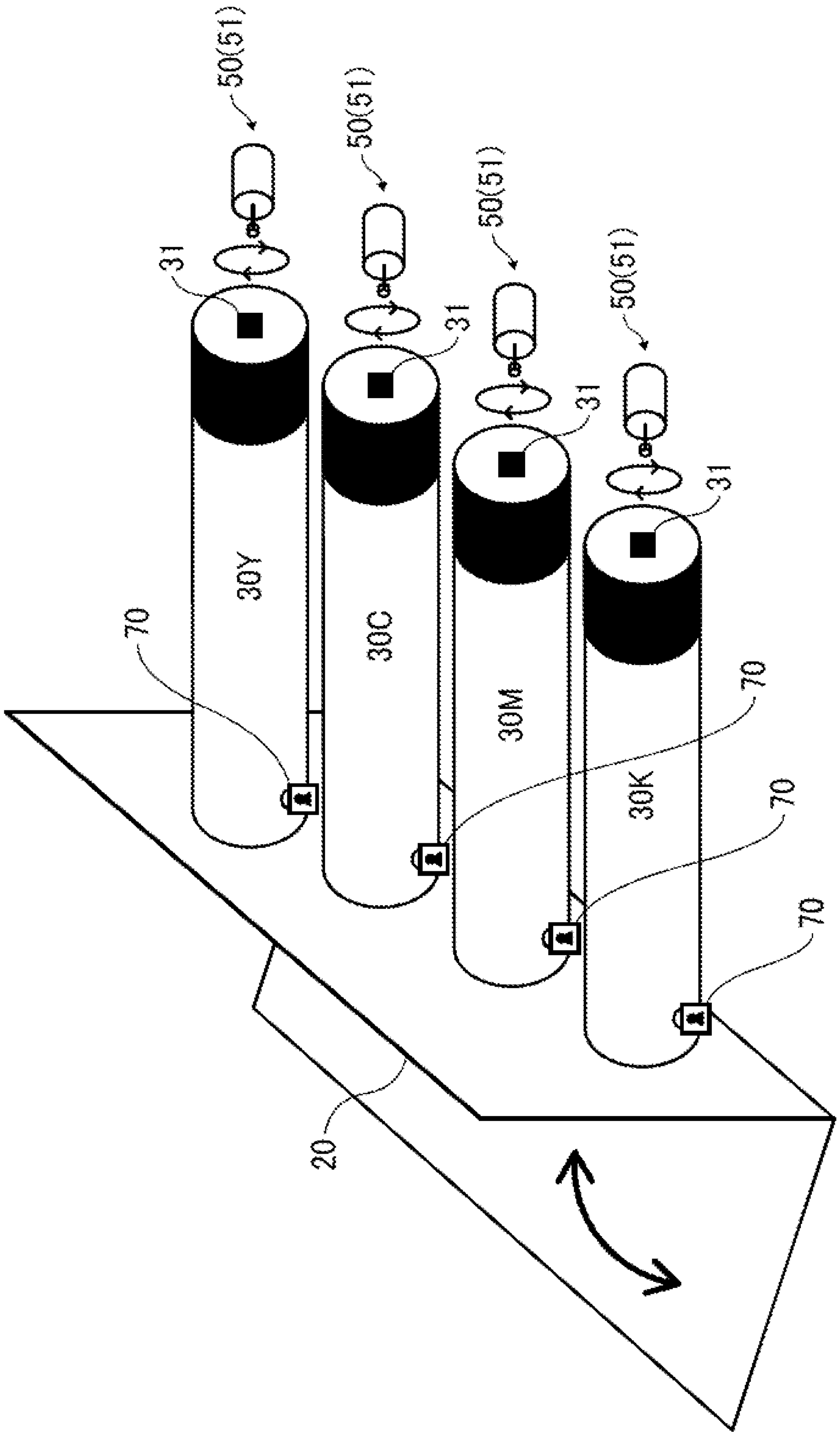
FIG. 2 is a schematic diagram illustrating an example of a configuration of toner containers according to an embodiment of the present disclosure.

With reference to FIGS. 1 and 2, an overall configuration of an image forming apparatus 1 according to the present embodiment is described. FIG. 1 is a front view illustrating an example of a configuration of the image forming apparatus 1 according to the present embodiment. FIG. 2 is a schematic diagram illustrating an example of a configuration of toner containers 30 according to the present embodiment.

The image forming apparatus 1 is a color image forming apparatus employing an electrophotographic method and includes a body 10 as illustrated in FIG. 1.

The body 10 includes photoconductors (image bearers) 11, an optical writing device 12, developing devices 13, a transfer device 14, and a fixing device 15. Hereinafter, any one of the photoconductors 11 is referred to as a photoconductor 11 and any one of the developing devices 13 is referred to as a developing device 13. The optical writing device 12 forms an electrostatic latent image on a photoconductor 11. A developing device 13 supplies toner to the electrostatic latent image on the photoconductor 11 to form a toner image. The transfer device 14 transfers the toner image on the photoconductor 11 onto a recording medium (sheet). The fixing device 15 fixes the toner image transferred onto the recording medium. Accordingly, an image is formed on the recording medium when the toner image is fixed.

Figure 3:
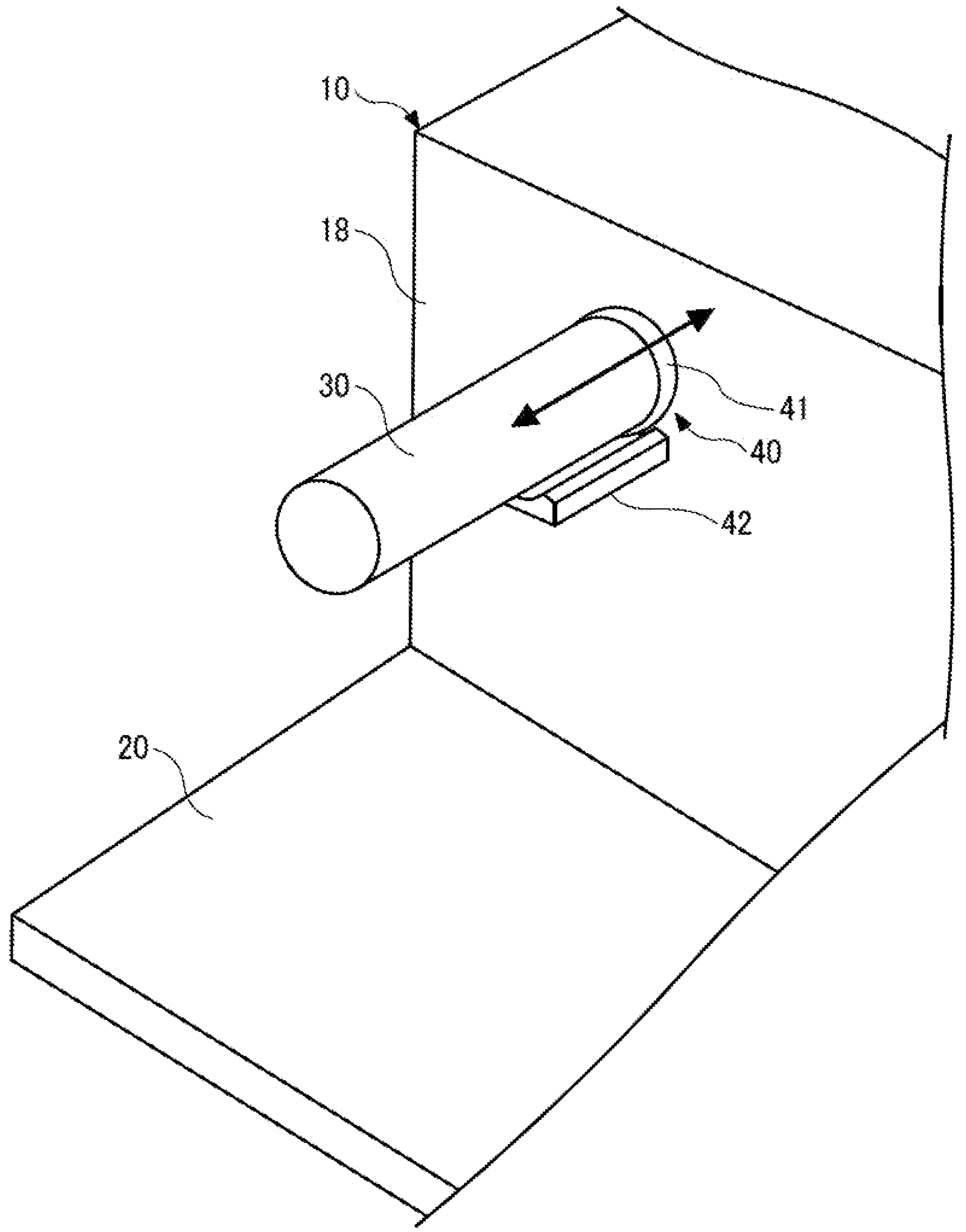
FIG. 3 is a partial perspective view illustrating a body of the image forming apparatus according to an embodiment of the present disclosure.

Further, the body 10 includes a front door 20 provided on the front surface so as to be opened and closed and toner containers 30 (30Y, 30C, 30M, 30K) that contain toners of respective colors (for example, yellow (Y), cyan (C), magenta (M), and black (K)) as illustrated in FIG. 2. The body 10 also includes, for each color, a toner container holder 40 that removably holds a corresponding toner container 30 as illustrated in FIG. 3. Hereinafter, any one of the toner containers 30 is referred to as a toner container 30. Furthermore, the body 10 includes toner supply mechanisms 50 (see FIGS. 2 and 4), lock mechanisms 70 (see FIGS. 2 and 5), and the like. Hereinafter, any one of the toner supply mechanisms 50 is referred to as a toner supply mechanism 50 and any one of the lock mechanisms 70 is referred to as a lock mechanism 70. The toner supply mechanisms 50 serve as toner suppliers.

A toner container 30 has a substantially cylindrical shape and contains toner therein. Note that the shape of the toner container 30 is not limited to the substantially cylindrical shape. Further, the toner container 30 includes a nonvolatile memory 31 such as an electrically erasable programmable read-only memory (EEPROM).

An example of information stored in the nonvolatile memory 31 is unique information (for example, a serial number) assigned to an individual toner container. The nonvolatile memory 31 may also store color information indicating color of the toner contained in the toner container 30 and information indicating an estimated amount of the toner remaining in the toner container 30. The information stored in the nonvolatile memory 31 is acquired by, for example, a reading device provided in the body 10. Note that the information stored in the nonvolatile memory 31 is not limited thereto. The nonvolatile memory 31 is an example of a "memory." The information of the toner container 30 stored in the nonvolatile memory 31 is an example of "container information."

Further, the toner container 30 is coupled to a container rotation motor 51 of a toner supply mechanism 50. When the container rotation motor 51 drives the toner container 30 to rotate, the toner contained in the toner container 30 is discharged to the outside. Furthermore, a lock mechanism 70 locks the toner container 30 held in a toner container holder 40. Here, "locking (to lock)" the toner container 30 refers to an operation in which the lock mechanism 70 restricts the toner container 30 from being removed from the toner container holder 40. On the other hand, "unlocking (to unlock)" the toner container 30 refers to an operation in which the lock mechanism 70 allows the toner container 30 to be removed from the toner container holder 40.

Toner Container Holder

Next, with reference to FIG. 3, the toner container holder 40 according to the present embodiment is described in detail. FIG. 3 is a partial perspective view illustrating the body as viewed from a front surface 18. As illustrated in FIG. 3, the toner container holder 40 includes a container holding mouth 41 that is recessed from the front surface 18 of the body toward the inside and a cover 42 that closes the container holding mouth 41.

For example, it is assumed that a new toner container 30 is set in the body 10 to replace an existing toner container 30 in the body 10. After the front door 20 and the cover 42 are opened manually by a user or open automatically, the new toner container 30 is pushed into the container holding mouth 41 of the toner container holder 40. Here, the new toner container 30 refers to another toner container 30 to be newly set in the body 10 and the existing toner container 30 refers to the toner container 30 that has already been set in the body 10. After the new toner container 30 is pushed in, the front door 20 and the cover 42 are closed manually by the user or close automatically. Thus, the new toner container 30 is held in the toner container holder 40 and set in the body 10.

By contrast, it is assumed that the existing toner container 30 is removed from the body 10. After the front door 20 and the cover 42 are opened manually by the user or open automatically, the existing toner container 30 is drawn out from the container holding mouth 41 of the toner container holder 40.

Each of the toner container holders 40 may further include a toner container detection sensor 44 (see FIG. 5) for detecting holding of the toner container 30. An example of the toner container detection sensor 44 is an optical sensor. However, the toner container detection sensor 44 is not limited to the optical sensor.

Toner Supply Mechanism

Figure 4:
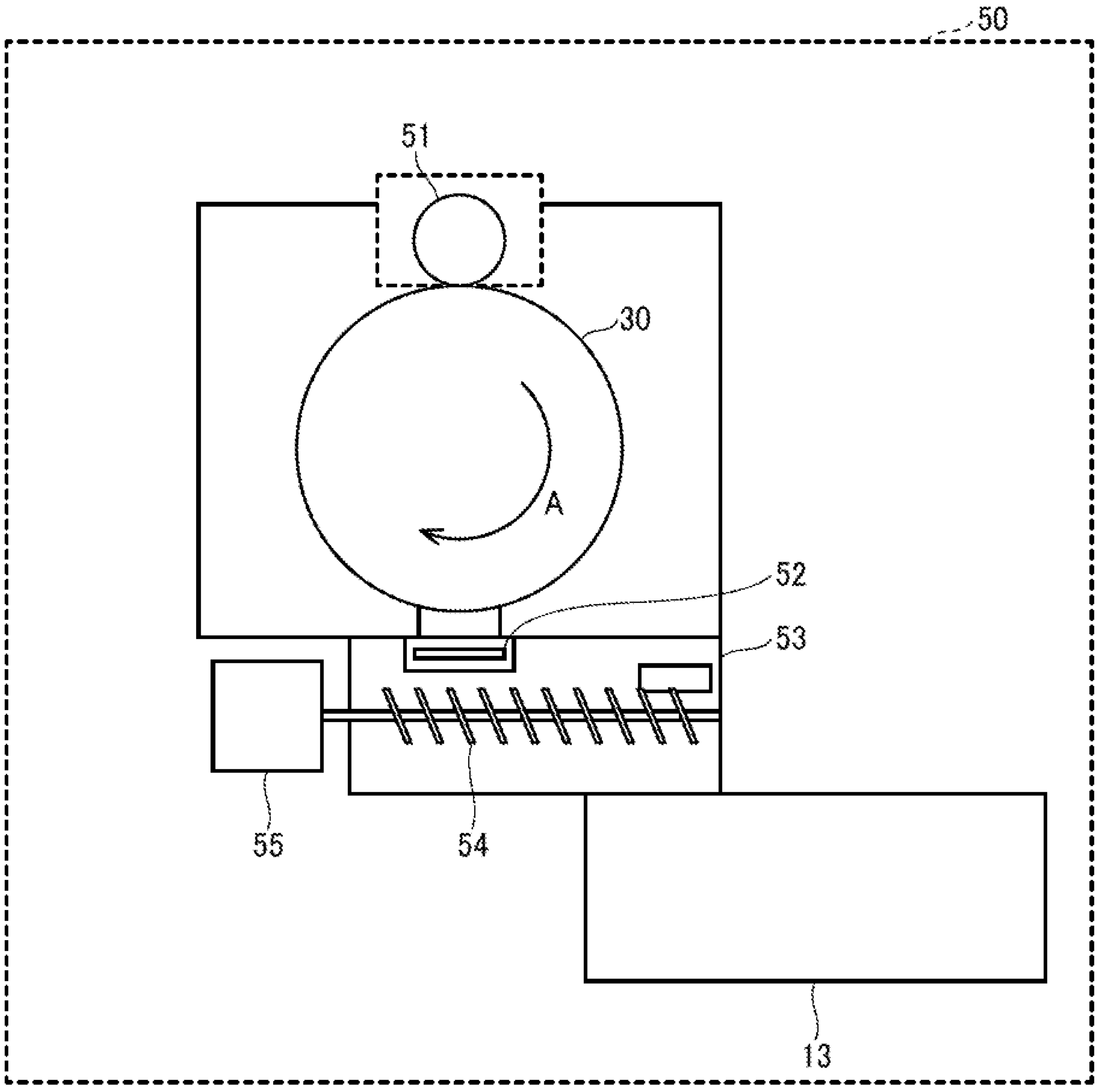
FIG. 4 is a schematic diagram illustrating an example of a configuration of one of toner supply mechanisms according to an embodiment of the present disclosure.

Next, with reference to FIG. 4, the toner supply mechanism 50 according to the present embodiment is described in detail. FIG. 4 is a schematic diagram illustrating an example of a configuration of the toner supply mechanism 50 according to the present embodiment. The toner supply mechanism 50 is provided on the back side of the toner container holder 40 (inside the body 10) and supplies toner from the toner container 30 held in the toner container holder 40 to the developing device 13.

More specifically, as illustrated in FIG. 4, the toner supply mechanism 50 includes the container rotation motor 51, a toner sensor 52, a toner conveyance path 53, a screw 54, and a screw driving motor 55. The container rotation motor 51 drives the toner container 30 to rotate. The toner sensor 52 detects toner discharged from the toner container 30.

The toner container 30 has a groove that meshes with a gear train of the container rotation motor 51 on an outer circumferential surface of the toner container 30. In accordance with the rotation of the container rotation motor 51, the toner container 30 rotates (for example, rotates in the direction indicated by arrow A). Thus, the toner is discharged to the outside of the toner container 30.

The toner sensor 52 according to the present embodiment is not particularly limited, but is a piezoelectric sensor provided in the toner conveyance path 53. When the toner discharged from the toner container 30 falls and contacts the toner sensor 52, the toner sensor 52 detects the toner in the toner container 30. The toner sensor 52 outputs a detection signal of the toner to a controller.

Further, the screw 54 rotated by the screw driving motor 55 conveys the toner discharged from the toner container 30 to the developing device 13. Thus, the toner supply mechanism 50 supplies the toner to the developing device 13.

Lock Mechanism of Toner Container

Figure 5:
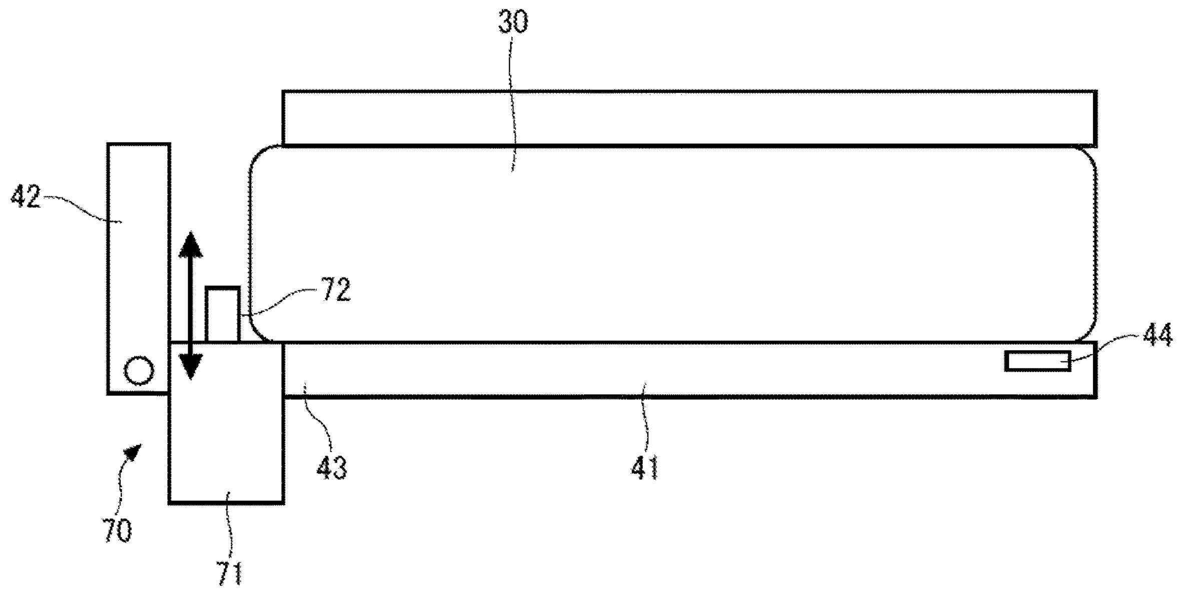
FIG. 5 is a schematic diagram illustrating one of lock mechanisms locking a toner container according to an embodiment of the present disclosure.

Next, with reference to FIG. 5, the lock mechanism 70 according to the present embodiment is described in detail. FIG. 5 is a schematic diagram illustrating the lock mechanism 70 locking the toner container 30 held in the toner container holder 40 according to the present embodiment.

The lock mechanism 70 according to the present embodiment includes a solenoid 71 positioned between an opening end 43 of the toner container holder 40 (the container holding mouth 41) and the cover 42, and a protruding portion 72 that moves up and down by driving of the solenoid 71. Note that the configuration of the lock mechanism 70 is not limited to the configuration illustrated in FIG. 5.

In order for the lock mechanism 70 to lock the toner container 30, for example, the solenoid 71 drives the protruding portion 72 to move upward based on a control signal from the controller. That is, when the toner container 30 is to be removed from the toner container holder 40, the protruding portion 72 interferes with the toner container 30 and restricts further movement of the toner container 30.

On the other hand, in order for the lock mechanism 70 to unlock the toner container for example, the solenoid 71 drives the protruding portion 72 to move downward based on a control signal from the controller. Thus, the lock mechanism 70 allows the toner container 30 to be removed from the toner container holder 40.

When the toner sensor 52 detects that the toner container 30 held in the toner container holder 40 is depleted, the controller preferably controls the lock mechanism 70 to unlock the toner container 30.

Hardware Configuration of Image Forming Apparatus

Figure 6:
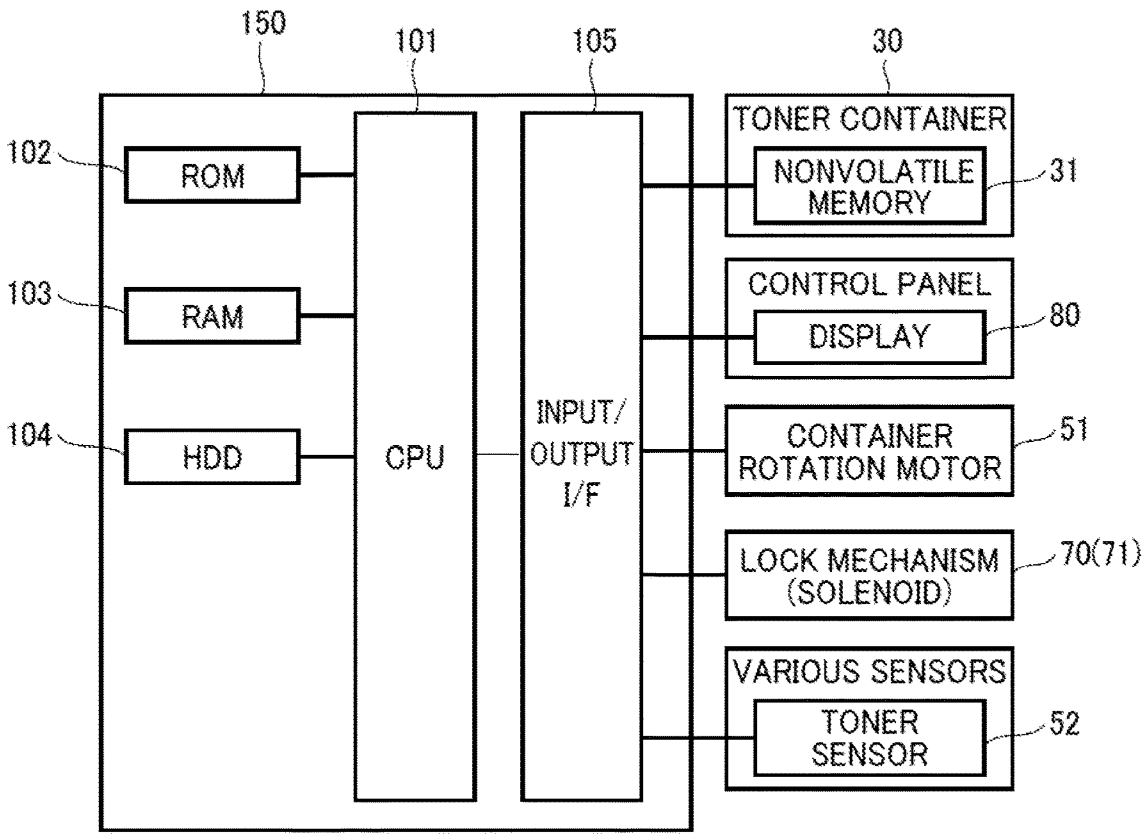
FIG. 6 is a block diagram illustrating an example of a hardware configuration of a controller according to an embodiment of the present disclosure.

Next, with reference to FIG. 6, an example of a hardware configuration of a controller 150 according to the present embodiment is described. FIG. 6 is a block diagram illustrating an example of a hardware configuration of the controller 150 according to the present embodiment.

As illustrated in FIG. 6, the controller 150 includes a central processing unit (CPU) 101, a read only memory (ROM) 102, a random access memory (RAM) 103, a hard disk drive (HDD) 104, and an input/output interface (UF) 105.

The CPU 101 reads programs and data from the ROM 102 and the HDD 104 onto the RAM 103 and executes predetermined processing defined by the programs to control the entire operation of the image forming apparatus 1.

The nonvolatile memory 31 included in the toner container 30, a display 80 included in a control panel, the container rotation motor 51, the lock mechanism 70 (the solenoid 71), and the toner sensor 52 are communicably connected to the CPU 101 via the input/output OF 105. The CPU 101 performs predetermined calculations according to various signals (data) input from the above-described devices, and outputs control signals.

Functional Configuration of Controller

Figure 7:
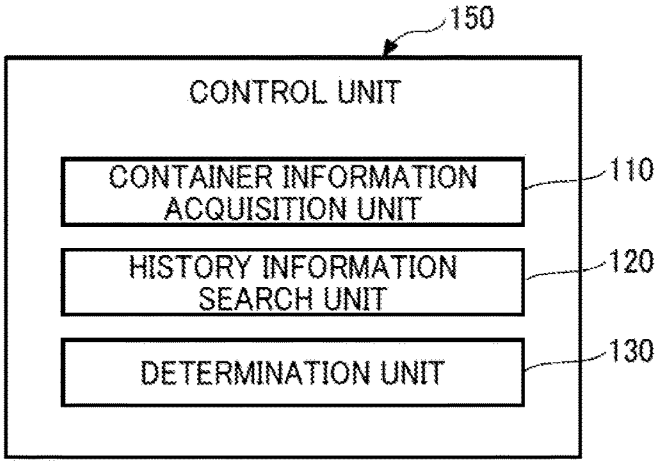
FIG. 7 is a block diagram illustrating an example of a functional configuration of the controller according to an embodiment of the present disclosure.

Next, with reference to FIG. 7, a functional configuration of the controller 150 according to the present embodiment is described. FIG. 7 is a block diagram illustrating an example of a functional configuration of the controller 150 according to the present embodiment. As illustrated in FIG. 7, the controller 150 includes a container information acquisition unit 110, a history information search unit 120, and a determination unit 130.

Each of the above-described functions of the controller 150 is implemented by the CPU 101 reading the programs and the data from the ROM 102 and the HDD 104 onto the RAM 103 and executing the predetermined processing defined by the programs. Some or all of the functions of the controller 150 may be implemented by an electronic circuit such as an application specific integrated circuit (ASIC) or a field-programmable gate array (FPGA).

The container information acquisition unit 110 acquires, from the nonvolatile memory 31 included in the toner container 30 set in the body 10, container information of the toner container 30 including the unique information.

The HDD 104 stores, as set container history information, container information of the toner container 30 that was set in the body 10 in the past. The history information search unit 120 refers to the set container history information to search for a piece of container information of the toner container 30 among the pieces of container information of the toner containers 30 set in the body 10 in the past. The piece of container information of the toner container 30 to be searched for here is a piece of container information that matches the container information of a new toner container 30 acquired by the container information acquisition unit 110.

When extracting the piece of container information that matches the container information of the new toner container 30 set in the body 10 from the set container history information, the history information search unit 120 outputs the extracted piece of container information to the determination unit 130.

The determination unit 130 determines whether the new toner container 30 set in the body 10 is empty based on the container information output from the history information search unit 120, and also determines whether the new toner container 30 reset in the body 10 is highly likely to contain toner.

Processing

Figure 8:
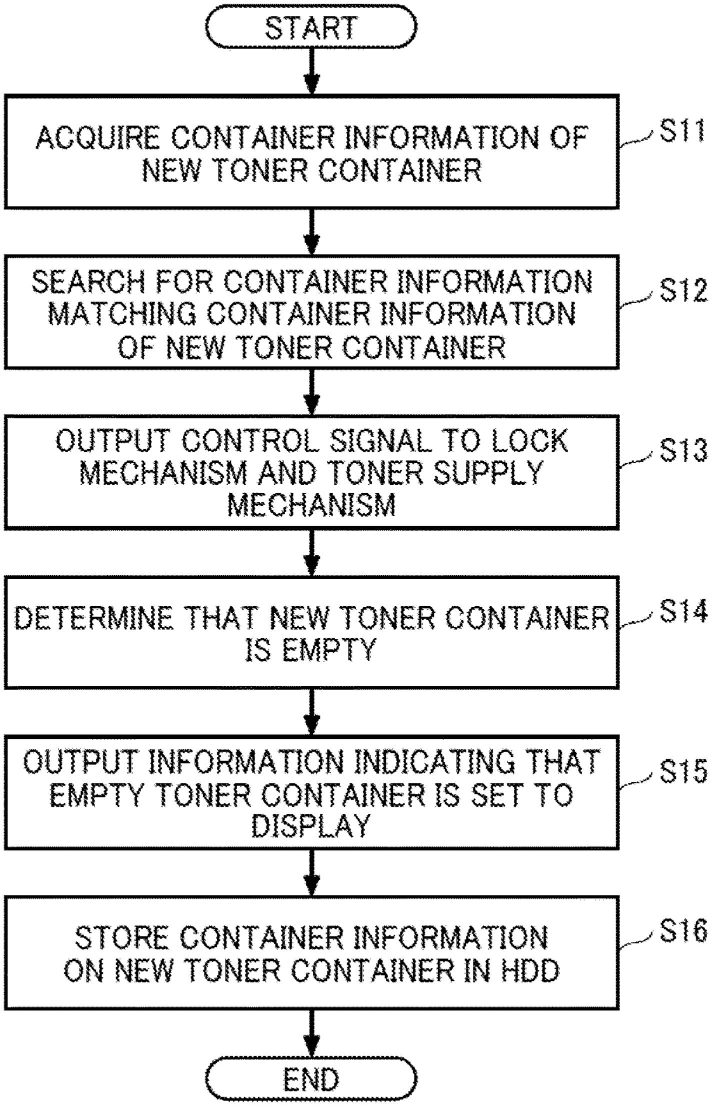
FIG. 8 is a flowchart illustrating processing performed by the image forming apparatus to determine whether a new toner container is empty according to an embodiment of the present disclosure.
Figure 9:
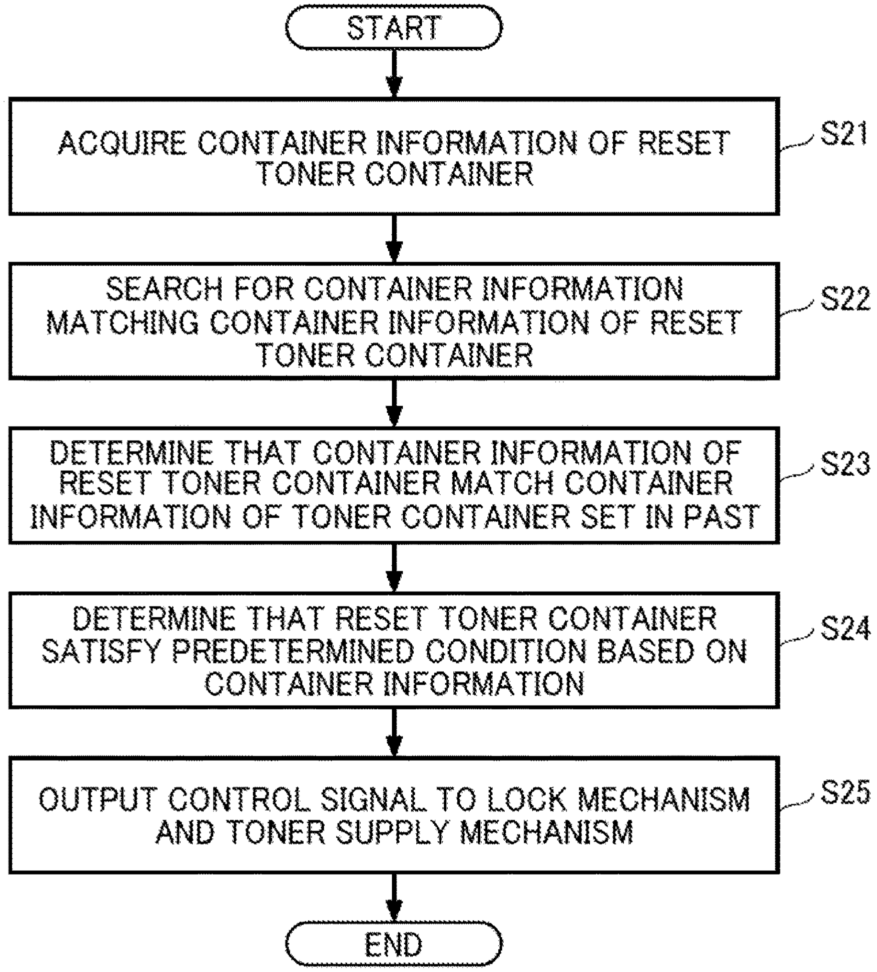
FIG. 9 is a flowchart illustrating processing performed by the image forming apparatus to determine whether a reset toner container is highly likely to contain toner according to an embodiment of the present disclosure.
Figure 10:
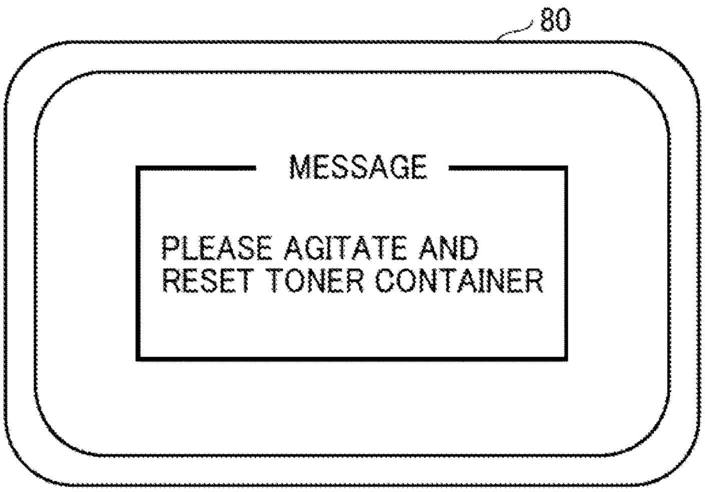
FIG. 10 is a diagram illustrating an example of message information displayed on a display according to an embodiment of the present disclosure.

Next, with reference to FIGS. 8 to 10, processing performed by the image forming apparatus 1 according to the present embodiment is described. FIG. 8 is a flowchart illustrating processing performed by the image forming apparatus 1 to determine whether a new toner container 30 is empty according to the present embodiment. FIG. 9 is a flowchart illustrating processing performed by the image forming apparatus 1 to determine whether a reset toner container 30 is highly likely to contain toner according to the present embodiment. FIG. 10 is a diagram illustrating an example of message information displayed on the display according to the present embodiment.

When a used (depleted) toner container 30 is removed from the body 10 and replaced with a new toner container 30 by the user, the container information acquisition unit 110 of the controller 150 acquires, for example, the unique information included in the container information of the new toner container 30 (step S11) as illustrated in FIG. 8. The container information acquisition unit 110 outputs the acquired unique information to the history information search unit 120.

Subsequently, in response to receiving the unique information of the new toner container 30, the history information search unit 120 refers to the set container history information stored in the HDD 104 to search for a piece of container information that matches the container information of the new toner container 30 among the pieces of container information of the toner containers 30 set in the past (step S12).

Since the new toner container 30 is set in the body 10 for the first time, the history information search unit 120 does not extract the container information of the new toner container 30 from the set container history information. Accordingly, the determination unit 130 outputs a control signal to the lock mechanism 70 and the toner supply mechanism 50 (step S13). As a result, the solenoid 71 of the lock mechanism 70 locks the toner container and the container rotation motor 51 of the toner supply mechanism 50 drives the toner container 30 to rotate.

In a case where the toner contained in the toner container 30 is solidified and loses fluidity due to factors such as storage conditions, the toner is not discharged from the toner container 30 even when the toner container 30 is rotated by the container rotation motor 51. As a result, the toner sensor 52 does not detect the toner, and the determination unit 130 determines that the toner container 30 set in the body 10 is empty.

Similarly, in a case where the toner contained in the new toner container 30 is solidified and loses fluidity, the determination unit 130 determines that the new toner container 30 is empty (step S14), and outputs message information indicating that the new toner container 30 which is empty is set in the body 10 to the display 80 (step S15). Further, the determination unit 130 outputs the container information of the new toner container 30 to the HDD 104. The HDD 104 stores the container information of the new toner container 30 (step S16).

It is assumed that the user is notified that the new toner container 30 is empty and removes the new toner container 30 from the body 10. In a case where the new toner container 30 once removed from the body 10 is reset in the body 10 (referred to as a reset toner container 30), the container information acquisition unit 110 again acquires the container information including the unique information from the nonvolatile memory 31 included in the reset toner container 30 (step S21) as illustrated in FIG. 9.

In response to receiving the unique information of the reset toner container 30 from the container information acquisition unit 110, the history information search unit 120 refers to the set container history information stored in the HDD 104 to search for a piece of container information that matches the container information of the reset toner container 30 among the pieces of container information of the toner containers 30 set in the past (step S22).

As described above, the container information of the reset toner container 30 is already stored in the HDD 104 at the time the reset toner container 30 is first set in the body 10 as the new toner container 30. Therefore, the history information search unit 120 extracts a piece of container information of the reset toner container 30 from the set container history information. The determination unit 130 determines that the container information of the reset toner container 30 matches the piece of container information of the toner container 30 set in the past (step S23).

Subsequently, the determination unit 130 determines whether the reset toner container 30 satisfies a predetermined condition based on the container information of the reset toner container 30. An example of the predetermined condition is that, among the pieces of the information stored in the nonvolatile memory 31, for example, information indicating an estimated amount of the toner remaining in the toner container 30 is equal to or greater than a predetermined threshold value (remaining amount threshold value). The predetermined remaining amount threshold value is set, for example, by a manufacture based on empirical data. Another example of the predetermined condition is that, for example, information indicating the number of times the toner container 30 has been set in the body 10 is equal to or greater than a predetermined threshold value (for example, one). The information indicating the estimated amount of the toner remaining in the toner container 30 is an example of "information indicating a remaining amount of toner." The information of the number of times the toner container 30 has been set in the body 10 is an example of "information indicating a number of times."

Since toner remains in the reset toner container 30, the determination unit 130 determines that the reset toner container 30 satisfies the predetermined condition (step S24). Note that in a case where the determination unit 130 determines that the toner container 30 does not satisfy the predetermined condition, the determination unit 130 does not output the control signal to the lock mechanism 70 or the toner supply mechanism 50, and outputs information indicating that the toner container 30 set in the body 10 is empty to the display 80.

Subsequently, the determination unit 130 outputs the control signal to the lock mechanism 70 and the toner supply mechanism 50 (step S25). As a result, the solenoid 71 of the lock mechanism 70 locks the toner container 30 and the container rotation motor 51 of the toner supply mechanism 50 drives the toner container 30 to rotate.

When the toner is discharged from the reset toner container 30 and supplied to the developing device 13 by the operation performed by the image forming apparatus 1 as described above, development using the toner discharged from the reset toner container 30 can be performed.

When the determination unit 130 determines that the reset toner container 30 satisfies the predetermined condition, the determination unit 130 may output, to the display 80, message information for prompting the user to take some action for restoring the fluidity of the toner, for example, agitation of the toner container 30 (see FIG. 10). When the user takes an action to restore the fluidity of the toner in response to the notification of the message information, the possibility that the toner is supplied from the toner container 30 further increases.

In a case where the toner container 30 does not discharge the toner due to a factor such as solidification of the toner, the conventional image forming apparatus determines that the toner container 30 which is empty is set. Even when the toner container 30 is reset, the conventional image forming apparatus determines that the toner container 30 is the same toner container 30 set in the body 10 in the past. As a result, the toner supply mechanism 50 does not drive and the toner container 30 that is usable is discarded.

On the other hand, once the reset toner container 30 is determined to be empty due to a factor such as solidification of the toner, the image forming apparatus 1 according to the present embodiment determines whether the reset toner container 30 satisfies the predetermined condition that the reset toner container 30 is highly likely to contain the toner. Through such processing, the image forming apparatus 1 according to the present embodiment detects that the reset toner container 30 is highly likely to contain toner. In accordance with a result of the detection, the image forming apparatus 1 drives the toner supply mechanism 50 for forming an image. As a result, the toner container 30 that is highly likely to contain toner is prevented from being replaced with another toner container 30. Thus, usable toner contained in the toner container 30 is prevented from being discarded.

Aspects of the present disclosure are, for example, as follows.

In Aspect 1, an image forming apparatus includes a body, a toner container that is removably set in the body and contains toner, a toner supply mechanism that supplies the toner from the toner container to the body, a memory that stores container information of the toner container, and a controller that controls, after the toner container is set in the body, an operation performed by the toner supply mechanism based on the container information acquired from the memory. The controller drives the toner supply mechanism in a case where the toner container set in the body is determined to be the same toner container set in the body in the past and the container information satisfies a predetermined condition.

According to Aspect 2, in the image forming apparatus of Aspect 1, the container information includes information indicating a remaining amount of the toner in the toner container and the predetermined condition is a condition that the remaining amount of the toner is equal to or greater than a predetermined remaining amount threshold value.

According to Aspect 3, in the image forming apparatus of Aspect 1 or 2, the container information includes information indicating the number of times the same toner container has been set in the body and the predetermined condition is a condition that the information indicating the number of times is one or more.

According to Aspect 4, the image forming apparatus of any one of Aspect 1 to Aspect 3 further includes a display. The controller causes the display to display message information for prompting agitation of the toner container in the case where the container information satisfies the predetermined condition.

In Aspect 5, an image forming method performed by an image forming apparatus, the method includes supplying, by a toner supply mechanism, toner to a body of the image forming apparatus from a toner container removably set in the body, storing container information of the toner container in a memory, controlling, after the toner container is set in the body, an operation performed by the toner supply mechanism based on the container information acquired from the memory, and driving the toner supply mechanism in a case where the toner container set in the body is determined to be the same toner container set in the body in the past and the container information satisfies a predetermined condition.

In Aspect 6, a non-transitory recording medium carrying computer readable codes for controlling a computer system to perform a method, the method includes supplying, by a toner supply mechanism, toner to a body of an image forming apparatus from a toner container removably set in the body, storing container information of the toner container in a memory, controlling, after the toner container is set in the body, an operation performed by the toner supply mechanism based on the container information acquired from the memory, and driving the toner supply mechanism in a case where the toner container set in the body is determined to be the same toner container set in the body in the past and the container information satisfies a predetermined condition.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carries out or is programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image forming apparatus comprising:

a body;

a toner container that is removably set in the body and contains toner;

a toner supplier that supplies the toner from the toner container to the body;

a memory that stores container information being information of the toner container; and circuitry configured to:

determine, after the toner container is set in the body, based on the container information acquired from the memory, whether the toner container set in the body is same as a toner container set in the body in a past and the container information satisfies a predetermined condition; and drive the toner supplier in a case where the toner container set in the body is determined to be same as the toner container set in the body in the past and the container information satisfies the predetermined condition, wherein the container information includes information indicating a number of times the toner container has been set in the body, and the predetermined condition includes a condition that the information indicating the number of times is one or more.

2. The image forming apparatus according to claim 1, wherein the container information further includes information indicating a remaining amount of the toner in the toner container, and the predetermined condition further includes a condition that the information indicating the remaining amount of the toner is equal to or greater than a remaining amount threshold value.

3. An image forming apparatus comprising:

a body;

a toner container that is removably set in the body and contains toner;

a toner supplier that supplies the toner from the toner container to the body;

a memory that stores container information being information of the toner container;

a display; and circuitry configured to:

determine, after the toner container is set in the body, based on the container information acquired from the memory, whether the toner container set in the body is same as a toner container set in the body in a past and the container information satisfies a predetermined condition;

drive the toner supplier in a case where the toner container set in the body is determined to be same as the toner container set in the body in the past and the container information satisfies the predetermined condition; and cause the display to display message information for prompting agitation of the toner container in the case where the container information satisfies the predetermined condition.

4. The image forming apparatus according to claim 3, wherein the container information includes information indicating a remaining amount of the toner in the toner container, and the predetermined condition is a condition that the information indicating the remaining amount of the toner is equal to or greater than a remaining amount threshold value.

5. The image forming apparatus according to claim 3, wherein the container information includes information indicating a number of times a same toner container has been set in the body, and the predetermined condition is a condition that the information indicating the number of times is one or more.

6. An image forming method performed by an image forming apparatus, the method comprising:

storing, in a memory, container information being information of a toner container removably set in a body of the image forming apparatus;

determining, after the toner container is set in the body, based on the container information acquired from the memory, whether the toner container set in the body is same as a toner container set in the body in a past and the container information satisfies a predetermined condition; and driving a toner supplier to supply toner to the body of the image forming apparatus in a case where the toner container set in the body is determined to be same as the toner container set in the body in the past and the container information satisfies the predetermined condition, wherein the container information includes information indicating a number of times the toner container has been set in the body, and the predetermined condition is a condition that the information indicating the number of times is one or more.

* * * * *